United States Patent
Feng

(10) Patent No.: US 8,094,044 B2
(45) Date of Patent: Jan. 10, 2012

(54) PORTABLE ELECTRONIC DEVICE WITH SCROLL WHEEL CONTROL MODULE

(75) Inventor: Hsin-Yao Feng, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 879 days.

(21) Appl. No.: 12/133,509

(22) Filed: Jun. 5, 2008

(65) Prior Publication Data

US 2009/0160683 A1 Jun. 25, 2009

(30) Foreign Application Priority Data

Dec. 19, 2007 (CN) .......................... 2007 1 0203233

(51) Int. Cl.
*H03M 11/00* (2006.01)
(52) U.S. Cl. .................................................. 341/35
(58) Field of Classification Search ...................... 341/35
See application file for complete search history.

(56) References Cited

U.S. PATENT DOCUMENTS

| | | | | |
|---|---|---|---|---|
| 5,912,661 A * | 6/1999 | Siddiqui | .......... | 345/166 |
| 6,555,768 B2 * | 4/2003 | Deruginsky et al. | .......... | 200/4 |
| 6,697,053 B2 * | 2/2004 | Kajihara | .......... | 345/166 |
| 6,717,572 B1 * | 4/2004 | Chou et al. | .......... | 345/157 |
| 7,061,471 B2 * | 6/2006 | Bohn | .......... | 345/163 |
| 7,283,124 B2 * | 10/2007 | Pai | .......... | 345/167 |
| 7,433,933 B2 * | 10/2008 | Kotthoff et al. | .......... | 709/217 |
| 2005/0190146 A1 | 9/2005 | Chyc et al. | | |

FOREIGN PATENT DOCUMENTS

| | | |
|---|---|---|
| CN | 2243098 Y | 12/1996 |
| CN | 2588446 Y | 11/2003 |
| EP | 1291754 A2 | 3/2003 |
| JP | 2004172967 A | 6/2004 |

* cited by examiner

*Primary Examiner* — Stephen W Jackson
(74) *Attorney, Agent, or Firm* — Altis Law Group, Inc.

(57) ABSTRACT

A portable electronic device with scroll wheel control module includes a housing (20), a display (212) and two scroll wheel mechanisms (41,42). Two side walls (220) of the housing having a slot (222) defined therein. Each scroll wheel mechanism includes a main wheel (432), a circuit board (45) a touch switch (47) and a sensing apparatus (46). The main wheel has gratings (4322) defined therein and partially extends out from the slot of the side wall. The touch switch is below the main wheel and is positioned on a circuit board. The sensing apparatus includes a light source (462) configured for emitting light and a light sensing element (464) configured for receiving light from the gratings of the main wheel and producing a pulse signal. When the main wheel is pressed down, the touch switch produces an electronic signal.

20 Claims, 5 Drawing Sheets

PORTABLE ELECTRONIC DEVICE WITH SCROLL WHEEL CONTROL MODULE

BACKGROUND

1. Field of the Invention

The present invention relates to electronic devices, particularly, to a portable electronic device with a scroll wheel control module.

2. Description of Related Art

With the development of wireless communication and information processing technologies, portable electronic devices, such as mobile telephones and personal digital assistants (PDAs), are now in widespread use. These portable electronic devices enable consumers to enjoy high technology services, almost anytime and anywhere. A typical portable electronic device usually includes a housing, a display and a keypad assembly. The keypad assembly is made up of a plurality of keys. The keys of the keypad assembly usually occupy a large area of space, which limit the area of space for the display screen.

Therefore, a new portable electronic device with a scroll wheel control module is desired in order to overcome the above-described problems.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the present portable electronic device, in which.

DETAILED DESCRIPTION OF THE INVENTION

Figure 1:
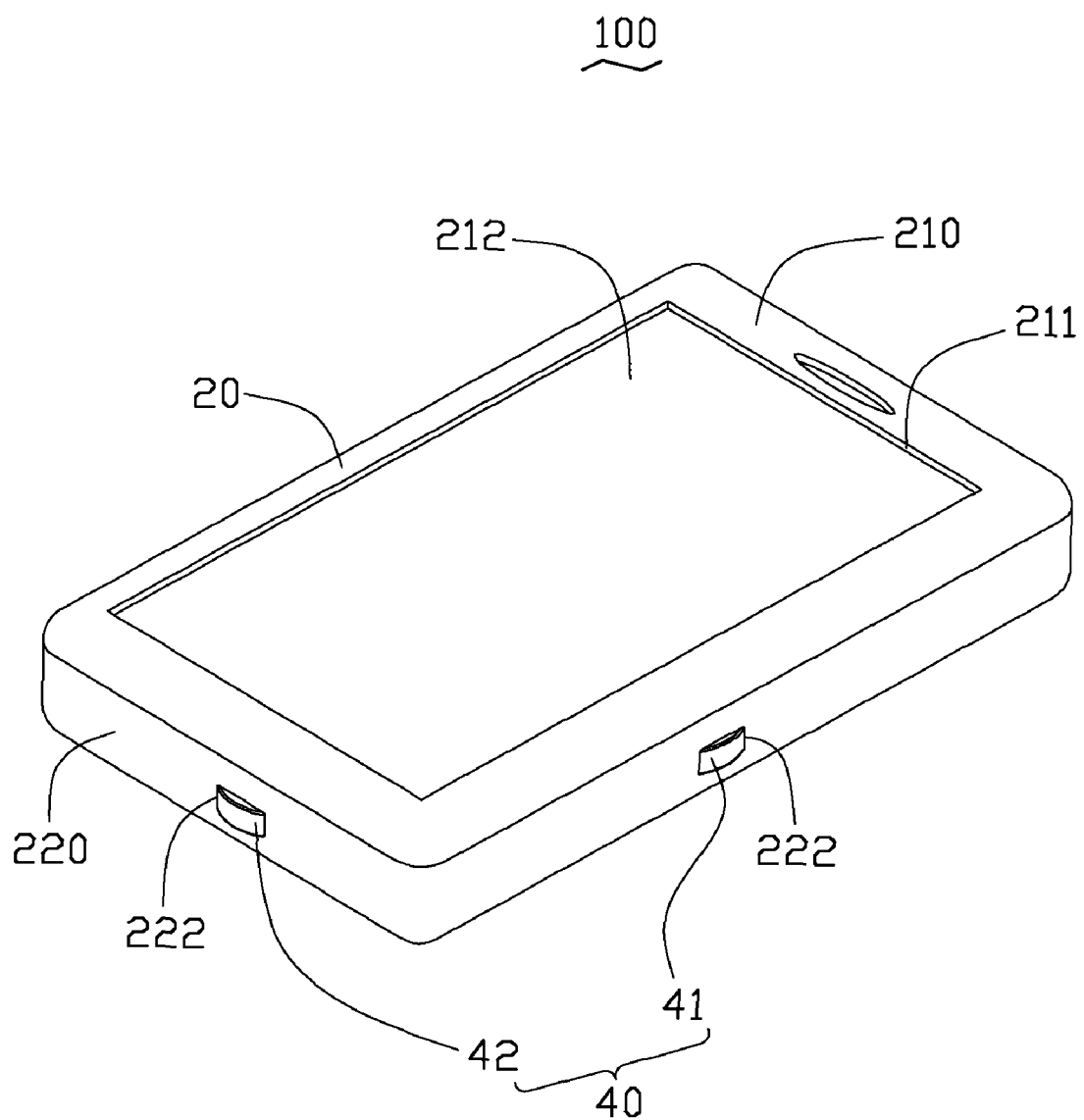
FIG. 1 is an isometric view of a portable electronic device with a scroll wheel control module, in accordance with a first exemplary embodiment of the invention.
Figure 2:
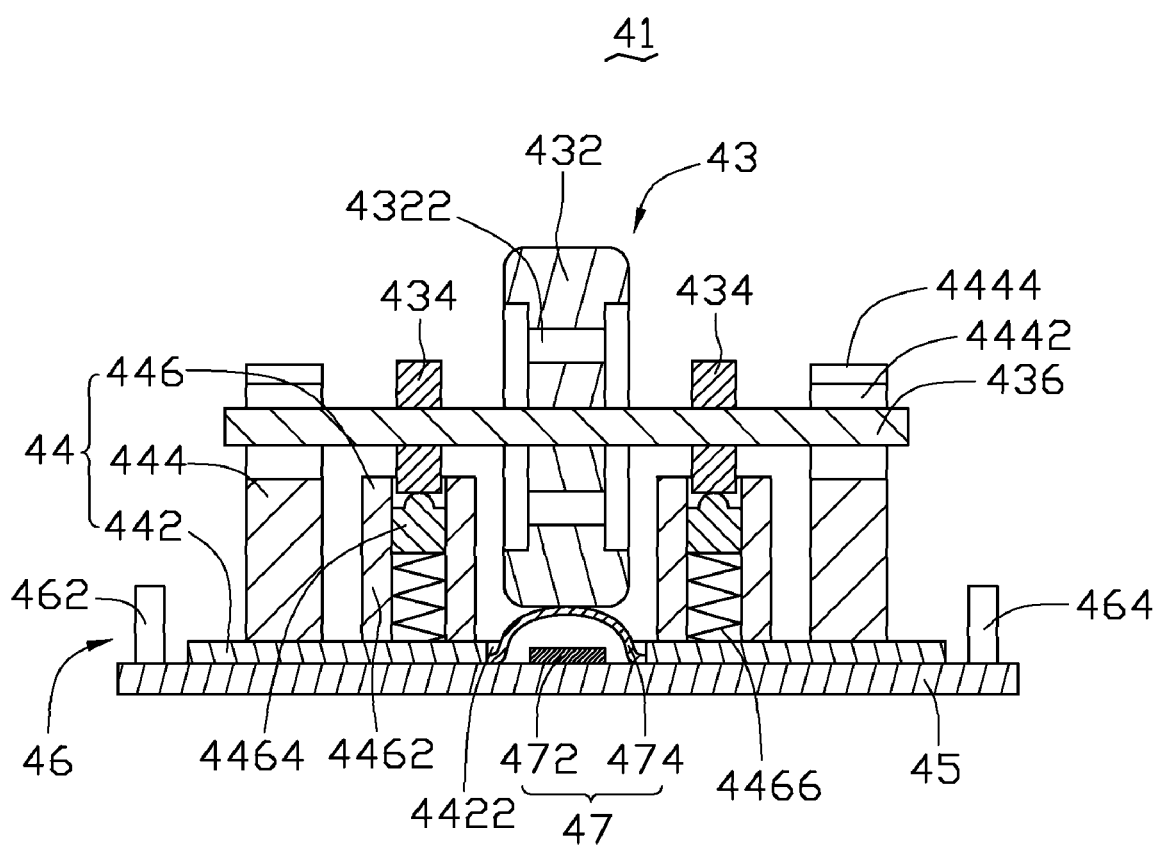
FIG. 2 is a cross sectional view of an assembled scroll wheel mechanism of the portable electronic device shown in FIG. 1.

Referring to FIGS. 1 and 2, a portable electronic device 100, such as mobile phone, moving picture experts group 4 (MP4) and personal digital assistant (PDA), includes a housing 20, a scroll wheel control module 40 and a microprocessor unit 70 (referring to FIG. 5), in accordance with a first exemplary embodiment of the invention, is shown.

The housing 20 is approximately rectangular shaped and includes a top wall 210 and four adjacent side walls 220. The top wall 210 defines an opening 211. A display 212 is arranged at the opening 211 of the top wall 210. Two intersected side walls 220 respectively have a rectangular slot 222 defined therein.

The scroll wheel control module 40 includes a first scroll wheel mechanism 41 and a second scroll wheel mechanism 42, which are respectively located in the housing 20. The structure of the second scroll wheel mechanism 42 is similar to the first scroll wheel mechanism 41. Herein the first scroll wheel mechanism 41 is illustrated, and the second scroll wheel mechanism 42 is not. The first scroll wheel mechanism 41 includes a wheel group 43, a supporting structure 44, a circuit board 45, a sensing apparatus 46 and a touch switch 47.

Figure 3:
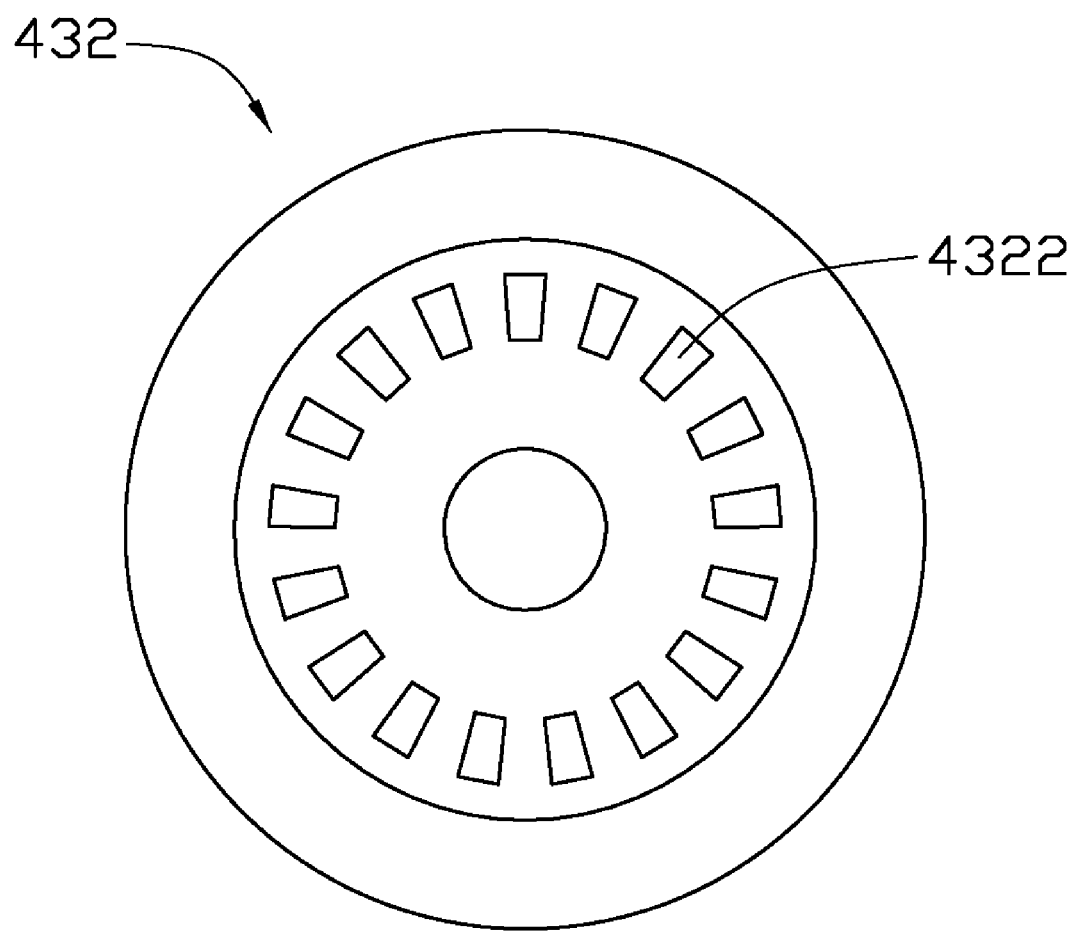
FIG. 3 is a front view of a main wheel of the scroll wheel mechanism shown in FIG. 2.

The wheel group 43 includes a main wheel 432, a shaft 436 and two driven wheels 434. The main wheel 432 is disposed near the middle portion of the shaft 436, and the two driven wheels 434 are symmetrically positioned towards the two sides of the main wheel 432. The shaft 436 connects the main wheel 432 and the two driven wheels 434 so that the main wheel 432 and the driven wheels 434 rotate together. The main wheel 432 partially extends out from the slot 222 of the side walls 220, so that the scroll wheel mechanism 41 can be operated via the main wheel 432. The main wheel 432 is preferably a grated wheel. Also referring to FIG. 3, a plurality of spaced gratings 4322 are defined in the main wheel 432. The gratings 4322 allow light passing therethrough.

Figure 4:
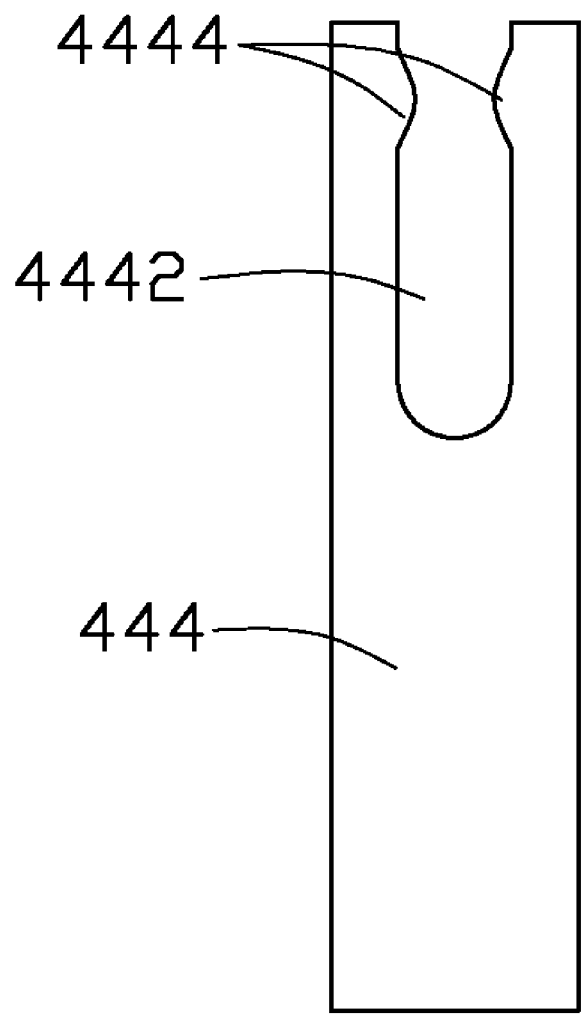
FIG. 4 is a side view of a supporting arm of the scroll wheel mechanism shown in FIG. 2.

The supporting structure 44 includes a bottom board 442, two supporting arms 444 and two elastic devices 446. The bottom board 442 is mounted on the circuit board 45, and has a through hole 4422 defined in a center area thereof. The through hole 4422 is configured for receiving the touch switch 47. The two supporting arms 444 are respectively fixed on the bottom board 442 and are symmetrically positioned at the two sides of the main wheel 432. Also referring to FIG. 4, each supporting arm 444 has a receiving groove 4442 defined therein with an opening (not shown) at one end of the receiving groove 4442. The two receiving grooves 4442 are configured for receiving two ends of the shaft 436, so that the shaft 436 can vertically move along the receiving groove 4442. Two opposite protruding portions 4444 are respectively formed at two sidewalls of a corresponding receiving groove 4442. The protruding portions 4444 extend toward the opening of the receiving groove 4442, to prevent the shaft 436 from separating from the receiving groove 4442. Each elastic device 446 is positioned between the main wheel 432 and a corresponding supporting arm 444, corresponding to one of the two driven wheels 434. Each elastic device 446 includes a receiving sleeve 4462, a sliding block 4464 and a spring 4466. The receiving sleeve 4462 is a hollow cylinder and is configured for receiving the sliding block 4464 and the spring 4466 therein. The sliding block 4464 is positioned between the driven wheel 434 and the spring 4466. One end of the spring 4466 resists the bottom board 442 and the other end thereof resists the sliding block 4464. The sliding blocks 4464 resist the driven wheels 434 so as to support the wheel group 43 in the housing 20. When a small force is applied on the main wheel 432, spring 4466 provides a contrary force to counteract the small force, to prevent the main wheel 432 from contacting/pressing the touch switch 47.

The circuit board 45 is disposed below the wheel group 43 and the supporting structure 44. The touch switch 47 is fixed on a center area of the circuit board 45 and includes a dome 474 and a contact 472 under the dome 474. The dome 474 and the contact 472 are received in the through hole 4422 of the bottom board 442. The dome 474 is located below the main wheel 432. When the main wheel 432 is pressed with a non-small force, the dome 474 may be pressed to electronically connect with the contact 472, thereby producing an electronic signal.

The sensing apparatus 46 is used to detect the rotating direction and rotating speed of the main wheel 432. The sensing apparatus 46 includes a light source 462 and a light sensing element 464. The light source 462 and the light sensing element 464 are positioned at two opposite sides of the bottom board 442. The light source 462 may be a diode used for emitting light. The light emitted from the light source 462 can pass through the gratings 4322 of the main wheel 432. The light sensing element 464 may be a phototransistor. The light sensing element 464 is for sensing intensity, frequency and direction of the light passing the gratings 4322 of the main wheel 432, thereby producing a pulse signal. In order for most of the light emitted from the light source 462 to reach the main wheel 432, a conventional light tube (not shown) may be added to the light source 462, with an opening thereof for guiding the light to the main wheel 432.

Figure 5:
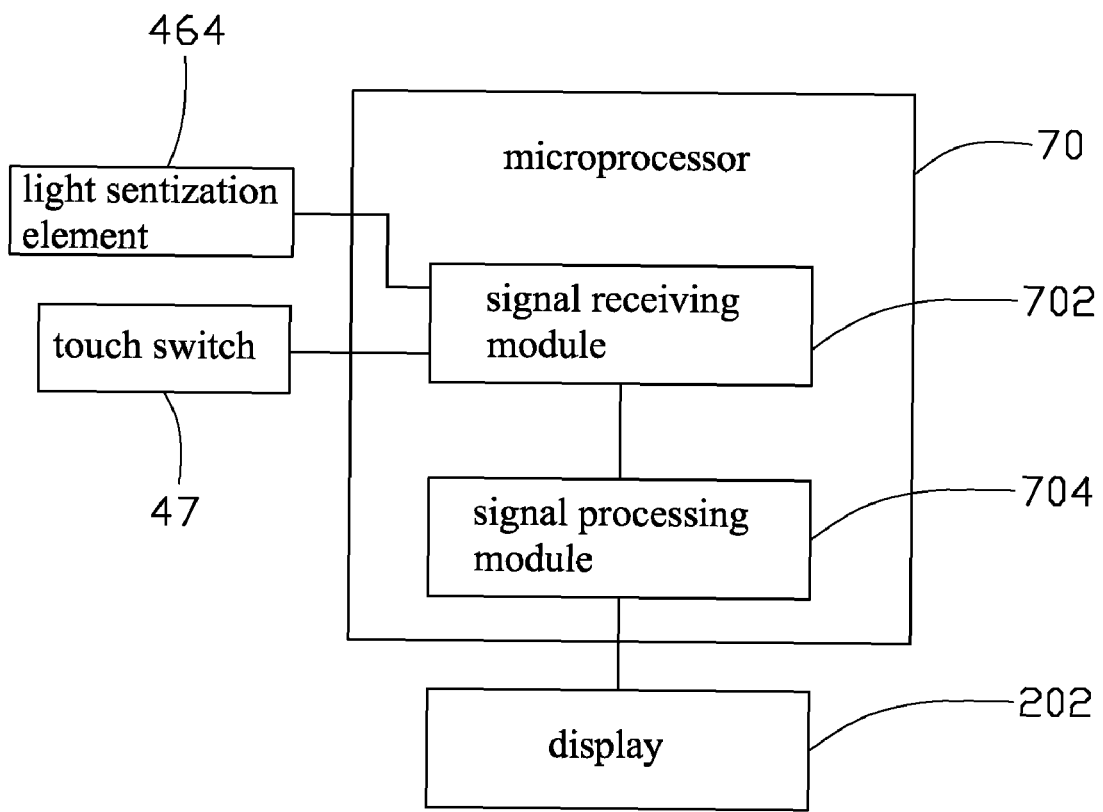
FIG. 5 is a functional block diagram of a microprocessor unit of the portable electronic device shown in FIG. 1.

Referring to FIG. 5, the microprocessor unit 70 includes a signal receiving module 702 and a signal processing module 704 electrically connects with the signal receiving module 702. The signal receiving module 702 electrically connects with the light sensing element 464 and the contact 472. The signal receiving module 702 receives the pulse signals from the light sensing element 464 and the electronic signals from the contact 472. The signal processing module 704 processes the pulse signal from the light sensing element 464 to determine the moving distance, moving speed and moving direction of a displayed pointer (cursor) on the display 212. The signal processing module 704 processes the electronic signal from the contact 472 and generates a commanding dictate.

The first scroll wheel mechanism 41 may control the displayed pointer's vertical movement The second scroll wheel mechanism 42 may control the displayed pointer's horizontal movement.

In use, rotating the main wheel 432 causes vertical movement of the displayed pointer. The main wheel 432 drives the shaft 436 and the driven wheels 434 to rotate. Light emitted from the light source 462 passes the gratings 4322 of the main wheel 432. The light sensing element 464 detects the light through the gratings 4322 of the main wheel 432 and produces a pulse signal. The microprocessor unit 70 receives and processes the pulse signal and causes the displayed pointer to move vertically. For another example, when a commanding dictate is needed, the main wheel 432 is pressed with the shaft 436 and the driven wheels 434 to movie down. The sliding blocks 4464 and the springs 4466 are pressed by the driven wheels 434. The dome 474 is pressed by the main wheel 432 to electrically connect with the contact 472, generating a commanding dictate. When the pressure applied on the main wheel 432 is released, the springs 4466 rebound to its original shape and respectively push the sliding blocks 4464 and the driven wheel 434 to move up. The shaft 436 and the main wheel 432 move with respect to the driven wheels 434 until reaching their original positions.

It should be understood that the scroll wheel control module 40 is arranged in the side walls 220 of the housing 20, so that the top wall 210 is free for arranging the display 212 thereof. Therefore, the size of the display 212 can be increased.

It is to be further understood that since the two main wheels 432 of the first scroll wheel mechanism 41 and the second scroll wheel mechanism 42 respectively extend out from the slots 222 of the two adjacent walls 220, it is easy for a user to operate the scroll wheel control module 40 with one hand.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A scroll wheel mechanism comprising:
   a main wheel having a plurality of gratings defined therein;
   a circuit board;
   a touch switch below the main wheel and being positioned on the circuit board at a position where the touch switch can be contacted by a portion of the main wheel;
   a sensing apparatus having a light source and a light sensing element, the light source being configured for emitting light, the light sensing element being configured for receiving light from the gratings of the main wheel and producing a pulse signal; and
   a microprocessor unit including a signal receiving module and a signal processing module, the signal receiving module electrically connected with the light sensing element and the touch switch, and the signal processing module electrically connected with the signal receiving module.

2. The scroll wheel mechanism as claimed in claim 1, wherein the touch switch comprises a dome and a contact under the dome, the dome is configured for being pressed down by a portion of the main wheel to electrically connect with the contact.

3. The scroll wheel mechanism as claimed in claim 1, further comprising a supporting structure, the supporting structure including two supporting arms positioned at opposite sides of the main wheel, the main wheel is fixed on a shaft, and the shaft is engaged with the supporting arms.

4. The scroll wheel mechanism as claimed in claim 3, wherein each supporting arm has a receiving groove defined therein, and two ends of the shaft are respectively received in the receiving grooves.

5. The scroll wheel mechanism as claimed in claim 4, wherein each supporting arm has two opposite protruding portions extending to the receiving groove for stopping movement of the shaft.

6. The scroll wheel mechanism as claimed in claim 5, wherein two driven wheels are fixed on the shaft and on opposite sides of the main wheel, the supporting structure further comprising two elastic devices corresponding to the two driven wheels.

7. The scroll wheel mechanism as claimed in claim 6, wherein each elastic device includes a receiving sleeve, a sliding block and a spring, the receiving sleeve is configured for receiving the sliding block and the spring, and the sliding block is between the spring and the driven wheel.

8. The scroll wheel mechanism as claimed in claim 1, wherein the light source is a diode.

9. The scroll wheel mechanism as claimed in claim 1, wherein the light sensing element is a phototransistor.

10. A portable electronic device with scroll wheel control module comprising:
    a housing including two side walls, each side wall having a slot defined therein; and
    two scroll wheel mechanisms positioned in the housing, each scroll wheel mechanism including:
    a wheel group including two driven wheels and a main wheel connected to each other, the main wheel having a plurality of gratings defined therein, the main wheel partially extending out from the slot of the side wall, two driven wheels positioned on opposite sides of the main wheel;
    a supporting structure including two elastic devices for elastically abutting against the driven wheels;
    a circuit board;
    a touch switch below the main wheel being positioned on the circuit board, the touch switch being configured for producing an electronic signal when the main wheel is pressed down; and
    a sensing apparatus having a light source and a light sensing element, the light source being configured for emitting light, the light sensing element being configured for receiving light from the gratings of the main wheel and producing a pulse signal.

11. The portable electronic device as claimed in claim 10, wherein each scroll wheel mechanism further comprises a microprocessor unit, the microprocessor unit includes a signal receiving module and a signal processing module, the signal receiving module electrically connects with the light sensing element and the touch switch, and the signal processing module electrically connects with the signal receiving module.

12. The portable electronic device as claimed in claim 11, wherein the touch switch comprises a dome and a contact under the dome, the dome is configured for being pressed down by a portion of the main wheel to electrically connect with the contact.

13. The portable electronic device as claimed in claim 10, further comprising a supporting structure, the supporting structure including two supporting arms positioned on opposite sides of the main wheel, the main wheel is fixed on a shaft, and the shaft is engaged with the supporting arms.

14. The portable electronic device as claimed in claim 13, wherein each supporting arm has a receiving groove defined therein, and two ends of the shaft are respectively received in the receiving grooves.

15. The portable electronic device as claimed in claim 14, wherein each supporting arm has two opposite protruding portions extending to the receiving groove for stopping movement of the shaft.

16. The portable electronic device as claimed in claim 15, wherein the driven wheels are fixed on the shaft on opposite sides of the main wheel, the supporting structure further comprising two elastic device corresponding to the two driven wheels.

17. The portable electronic device as claimed in claim 10, wherein each elastic device includes a receiving sleeve, a sliding block and a spring, the receiving sleeve is configured for receiving the sliding block and the spring, and the sliding block is between the spring and the driven wheel.

18. A portable electronic device with scroll wheel control module comprising:
   a housing including a top wall and two side walls, each side wall having a slot defined therein;
   a display positioned at the top wall of the housing; and
   two scroll wheel mechanisms positioned in the housing, one of the two scroll wheel mechanisms for controlling vertical movement of a displayed pointer of the display, the other one for controlling horizontal movement of a displayed pointer of the display, each scroll wheel mechanism including:
   a wheel group including a main wheel having a plurality of gratings defined therein, the main wheel partially extending out from the slot of the side wall;
   a circuit board;
   a touch switch below the main wheel being positioned on the circuit board, the touch switch including a dome and a contact under the dome, the dome configured for being pressed down by a portion of the main wheel to electrically connect with the contact for producing an electronic signal; and
   a sensing apparatus having a light source and a light sensing element, the light source being configured for emitting light, the light sensing element being configured for receiving light from the gratings of the main wheel and producing a pulse signal.

19. The portable electronic device as claimed in claim 18, further comprising a support structure, wherein the supporting structure comprises two elastic devices, the wheel group further includes two driven wheels and a shaft, the main wheel is fixed on the shaft, the driven wheels are fixed on the shaft on opposite sides of the main wheel, and the elastic devices correspond to the two driven wheels.

20. The portable electronic device as claimed in claim 19, wherein each elastic device includes a receiving sleeve, a sliding block and a spring, the receiving sleeve is configured for receiving the sliding block and the spring, and the sliding block is between the spring and the driven wheel.

* * * * *